(12) United States Patent
Smith et al.

(10) Patent No.: US 6,424,286 B1
(45) Date of Patent: Jul. 23, 2002

(54) IN-SEEKER JAMMING DEVICE

(75) Inventors: Brian J. Smith; Ralph H. Halladay, both of Huntsville; Michael R. Christian, Owens Cross Roads, all of AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/867,341

(22) Filed: May 30, 2001

(51) Int. Cl.⁷ ................................................ G01S 7/38
(52) U.S. Cl. .............................. 342/14; 342/15; 342/62
(58) Field of Search ............................. 342/13, 14, 15, 342/62, 63

(56) References Cited

U.S. PATENT DOCUMENTS 6,012,375 A * 1/2000 Eckstein ..................... 89/1.816
6,055,909 A * 5/2000 Sweeny ....................... 102/336

FOREIGN PATENT DOCUMENTS

| DE | 2362774 C | * | 8/1998 |
| FR | 2712683 A1 | * | 5/1995 |

OTHER PUBLICATIONS

"Adaptive mainbeam jamming suppression for multi-function radars", Nohara, T.J.; Weber, P.; Premji, A., Radar Conference, 1998. RADARCON 98. Proceedings of the 1998 IEEE, 1998, pp.:207–212.*

"3–D jammer localization using out–of–plane multipath", Coutts, S.D., Radar Conference, 1998. RADARCON 98. Proceedings o the 1998 IEEE, 1998, pp.: 219–224.*

"Statistical processing techniques for detecting DRFM repeat–jam radar signals", Hill, P.C.J.; Truffert, V., Signal Processing Techniques for Electronic Warfare, IEE Colloquium on, 1992, pp.: 1/1–1/6.*

* cited by examiner

Primary Examiner—John B. Sotomayor
(74) Attorney, Agent, or Firm—Arthur H. Tischer; Freddie M. Bush; Hay Kyung Chang

(57) ABSTRACT

In-Seeker Jamming Device, suitable for an RF missile, utilizes the high-gain antenna and amplifier that are already a part of the missile. During the "blind range" between the termination of the missile's active tracking of the target at a pre-selected distance from the target and its impact on the target, the Jamming Device produces signals that are broadcast via the missile's antenna and are designed to jam and frustrate the active protection system (APS) radars, thereby rendering the APS radars ineffective and the intended targets vulnerable.

6 Claims, 3 Drawing Sheets

IN-SEEKER JAMMING DEVICE

DEDICATORY CLAUSE

The invention described herein may be manufactured, used and licensed by or for the Government for governmental purposes without the payment to us of any royalties thereon.

BACKGROUND OF THE INVENTION

On the modern battlefield, many belligerents use active protection systems (APS) to protect their tanks and other armored vehicles from being detected and destroyed by enemy weapons such as anti-tank guided missiles and rocket-propelled grenades. The APS is placed on the vanguard to provide the protection and typically employs radars to detect and track the enemy missiles. The detection and the initial tracking of the incoming missile is then followed by appropriate counter attacks against them. Therefore, for a missile to achieve effective destruction of the targeted tanks and other armored vehicles, the initial detection by the APS radar must be avoided. Such avoidance of detection by APS radar by rendering the radar ineffective is referred to as counter-APS (CAPS).

To date, the most prominent CAPS technique involved the use of components of electronic warfare such as conformal antennas, radio frequency (RF) modules, signal processing units and power conditioning elements. These components were rendered into self-contained jamming kits, except the conformal antennas which were mounted on the surface of the missile. The kits were then inserted into anti-tank guided missiles (ATGM) to operate independently of the ATGM's primary guidance mode. Major problems with such kits include limited antenna gain resulting in reduced effectiveness of the jamming kit, high power consumption and increased weight of the missile.

SUMMARY OF THE INVENTION

In-Seeker Jamming Device is located in the seeker portion of an RF missile and utilizes the high-gain antenna and amplifier that are already a part of the missile. During the "blind range" between the termination of the missile's active tracking of the target at a pre-selected distance from the target and its impact on the target, the Jamming Device produces signals that are broadcast via the missile's antenna and are designed to jam and frustrate the APS radars, thereby rendering the APS radars ineffective and the intended targets vulnerable.

DESCRIPTION OF THE PREFERRED EMBODIMENT

Figure 1:
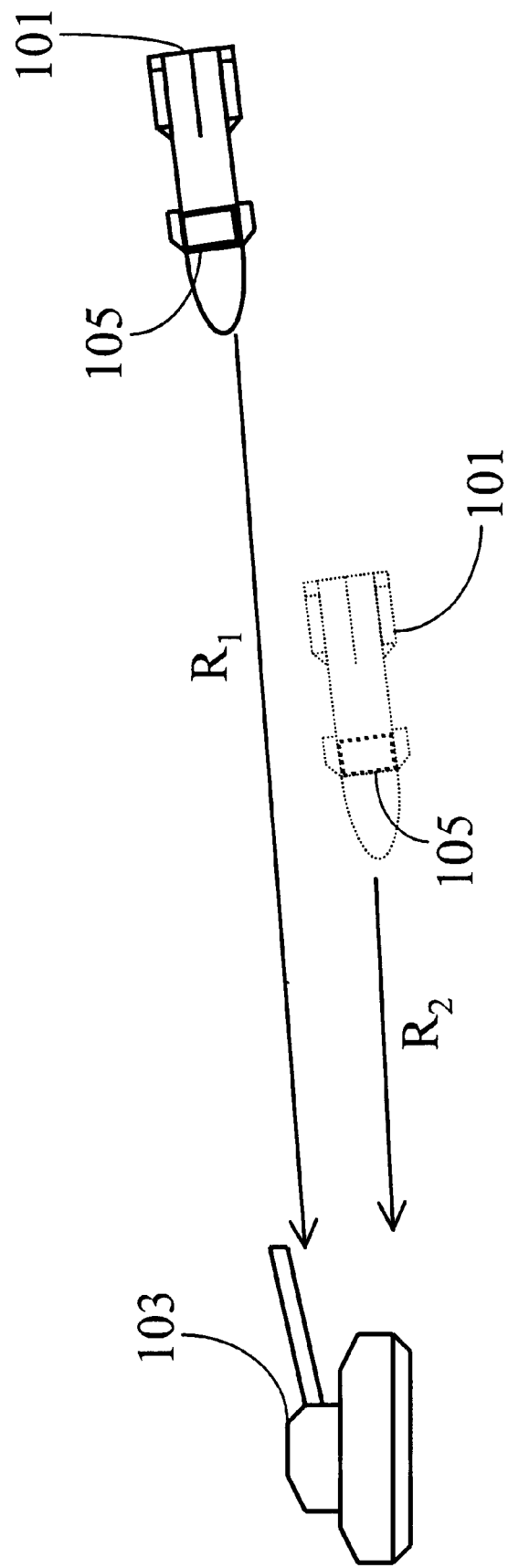
FIG. 1 depicts the overall scheme for taking advantage of the "blind range."

Referring now to the drawing wherein like numbers represent like parts in each of the several figures, the structure and the operation of the In-Seeker Jamming Device is explained in detail.

FIG. 1 depicts the overall scheme for taking advantage of the "blind range" (designated as $R_2$). More specifically, during the initial and mid-course portions, $R_1$, of the flight of missile 101 toward target 103, missile seeker 105 is used to track the target and provide guidance commands to the missile's autopilot. However, by the time the missile has reached the beginning point (from the missile's point of view) of $R_2$, which in the case of typical RF missiles is about 50–75 meters from the target, the missile's flight path has already been determined. From this point on, no further information from the seeker can be processed or made use of by the missile. It is during this blind range, or $R_2$, then that the missile's antenna and other components are engaged to serve the In-Seeker Jamming Device to provide the jamming of the APS radar.

Figure 2:
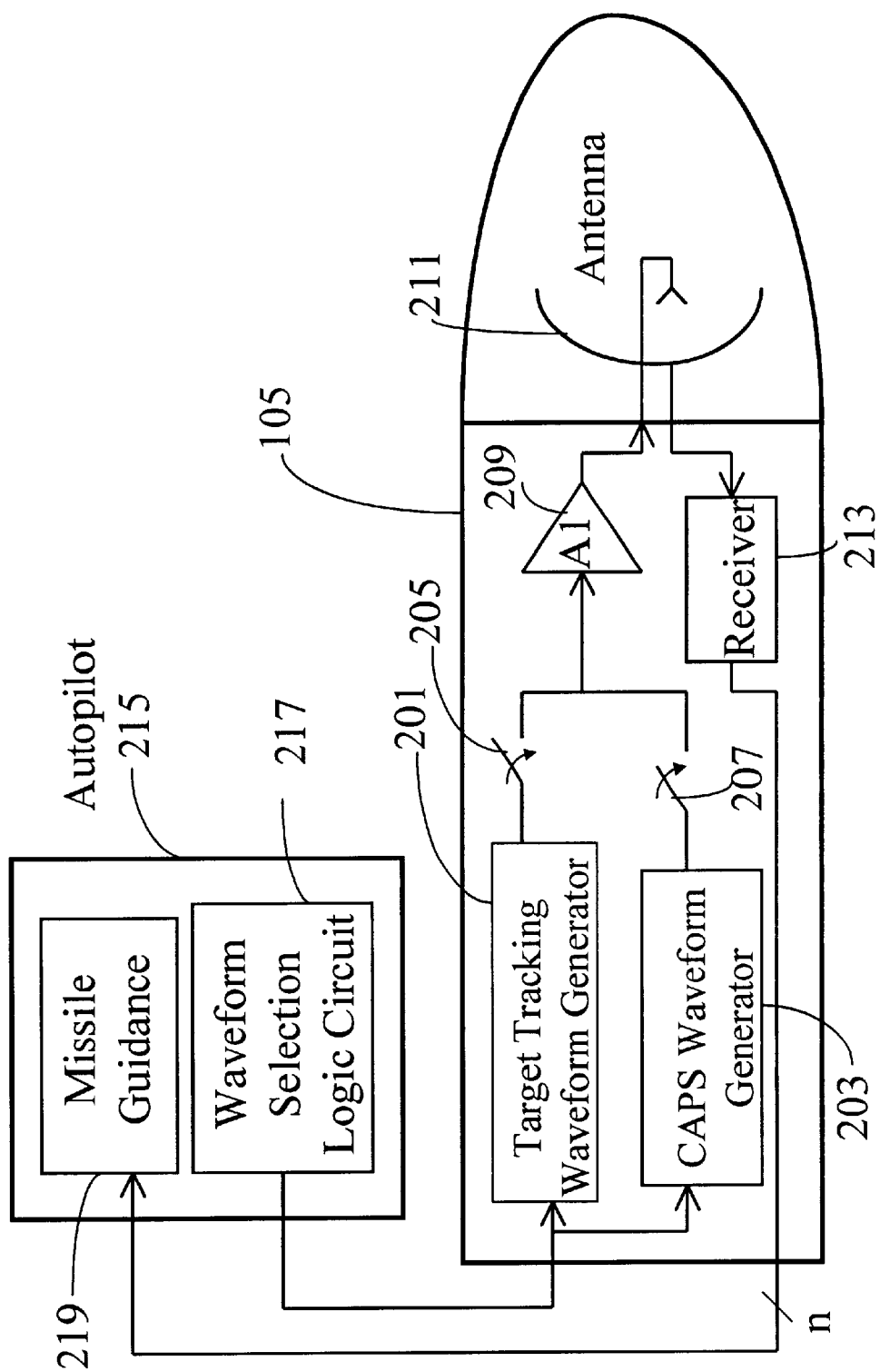
FIG. 2 illustrates the structure and operation of the In-Seeker Jamming Device when the APS radar is in the same band as the missile's seeker.

FIG. 2 illustrates the operation of the In-Seeker Jamming Device when the APS radar is in the same band as the missile's seeker. Simultaneously with the launch, first waveform generator 201 inside the seeker is engaged to produce the target tracking waveforms. These tracking waveforms are coupled via switch 205 to amplifier 209 where they are amplified prior to being transmitted to antenna 211. The antenna, then, radiates the target tracking waveforms to perform the target tracking function. However, as soon as the missile enters $R_2$, waveform selection logic circuit 217, located in autopilot 215 and suitably pre-programmed with the total distance from launch to the target and enabled to select between first waveform generator 201 and second waveform generator 203 when the missile enters $R_2$, disengages the first generator and engages the second generator. At the same time, switch 205 is opened and switch 207 is closed to provide a signal path between the second generator and amplifier 209. The second generator, upon being activated, produces counter-APS waveforms which are coupled to the amplifier via switch 207 and subsequently to antenna 211. The antenna, not being useful for target tracking purposes during $R_2$, is now used to radiate the counter-APS waveforms to jam the enemy APS radar. The use of the missile's high-power amplifier and high-gain antenna results in jamming signals of much greater strength than those produced by prior art jamming kits.

The In-Seeker Jamming Device may also have receiver 213, located in seeker 105 as shown in the figures, to receive incoming target signals from antenna 211 and transmit the target signals to autopilot. The target signals thus received contain information about the APS waveform (frequency, modulation type, power level, etc) which can be used by waveform selection logic circuit 217 to aid in the selection of an optimum CAPS waveform.

Figure 3:
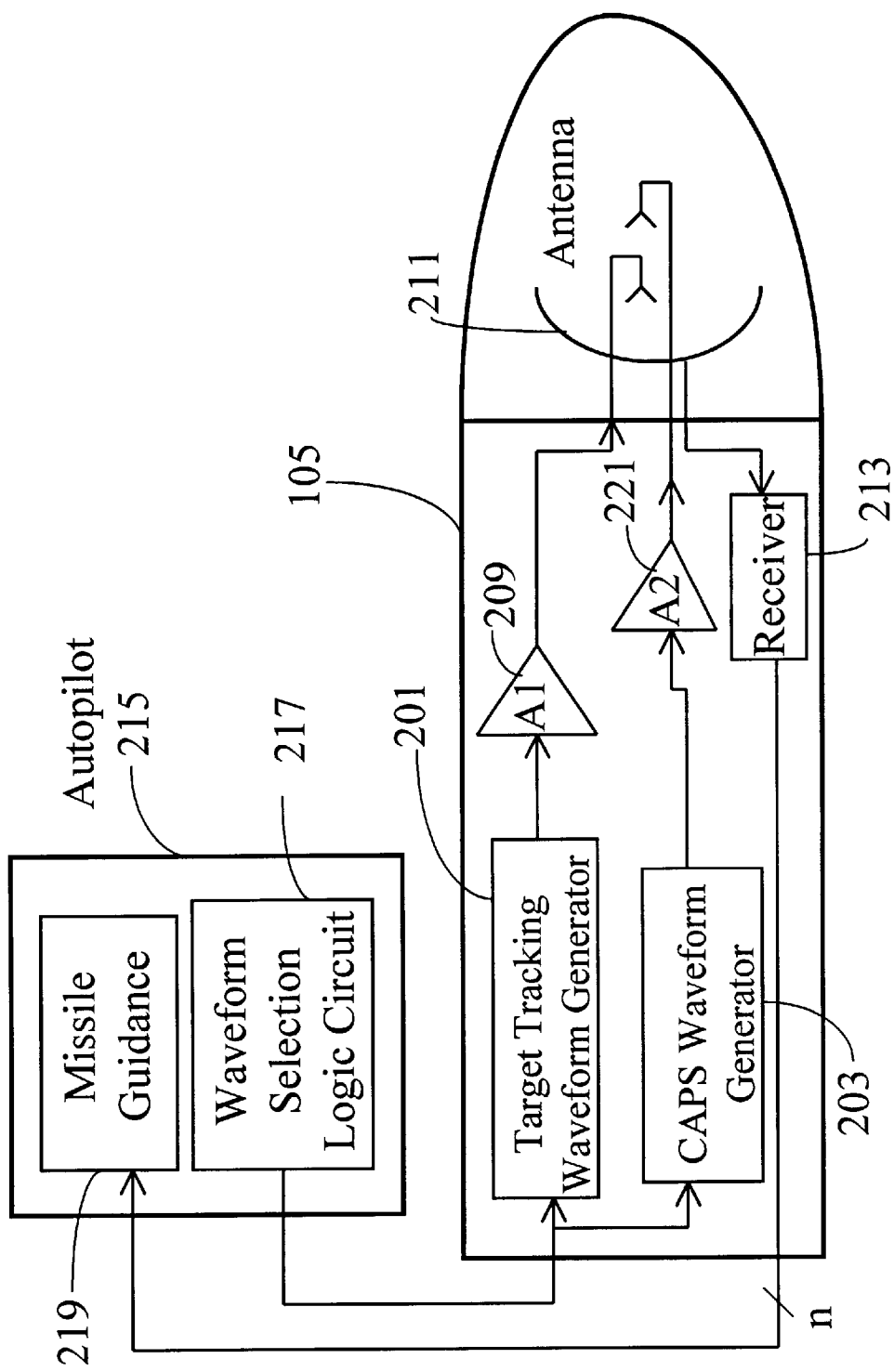
FIG. 3 illustrates the structure and operation of the In-Seeker Jamming Device when the APS radar is out of band with the seeker.

FIG. 3 illustrates the operation of the In-Seeker Jamming Device when the APS radar is out of the seeker's band. The out-of-band version operates in the same manner as the in-band version described above with respect to FIG. 2, except for requiring a second amplifier for the second generator. Because each of the generators has its own amplifier, there is no need for switches. As before, until $R_2$ is reached, target tracking waveform generator 201 is active and its waveforms are amplified by amplifier 209 and radiated by antenna 211. During this portion of the missile flight, generator 203 may be turned off to save battery power. Upon reaching the beginning point of $R_2$, waveform selection logic 217 deactivates generator 201 and activates generator 203. The jamming waveforms of generator 203 are radiated from the antenna. As illustrated in FIG. 3, two separate antenna feeds may be used since it is rather difficult to find a single feed that is broad band enough for both the target tracking and counter-APS waveforms. Since the waveforms from the two generators are out of band, they may be transmitted simultaneously throughout the missile's entire flight without fear of the signals interfering with each other.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. In an active RF missile having at least one antenna element, an autopilot and a seeker containing therein a first generator for generating a first waveform for tracking targets, the missile having a priori data relative to the range to the target upon being launched on its flight toward the target, an in-seeker jamming device for countering active protection systems that protect the target, said in-seeker jamming device comprising: a second generator residing in said seeker, said second generator generating a second waveform designed for jamming said active protection system; a means for selecting waveforms, said selecting means being coupled to said first and second waveform generators and motivating said generators such that only one of said generators is engaged to produce its corresponding waveform at any given moment; an amplifier; a first switching means coupled between said first generator and said amplifier; a second switching means coupled between said second generator and said amplifier, each of said switching means cooperating with said selecting means to provide a signal path between its corresponding generator and said amplifier whenever said corresponding generator is engaged, thereby enabling said amplified waveforms to travel from said amplifier to said antenna element and be radiated from said antenna element for ultimate jamming of said active protection system.

2. An in-seeker jamming device for countering active protection systems as set forth in claim 1, wherein said means for selecting waveforms comprises a logic circuit located in said autopilot, said logic circuit being capable of selectively engaging said first and second generators in response to the changing distance between the RF missile and the target.

3. An in-seeker jamming device as set forth in claim 2, wherein said jamming device further comprises a receiver coupled between said antenna element and said autopilot, said receiver receiving incoming target signals from said antenna and transmitting said target signals to said autopilot, said autopilot responding to said target signals so as to select the optimum CAPS waveform.

4. In an active RF missile having an autopilot and a seeker containing therein a first generator for generating tracking signals for tracking a preselected target, the first generator being actively engaged upon missile launch and the missile possessing a means to track the diminishing distance between itself and the target, an in-seeker jamming device for frustrating protective radars, the protective radars having been deployed to detect and enable destruction of the active RF missile, said in-seeker jamming device comprising: a second generator residing in said seeker, said second generator generating jamming signals designed for jamming said protective radar; a means for selecting signals, said selecting means being coupled to said first and second generators and further being capable of disengaging the first generator and engaging said second generator upon attainment of a pre-determined distance between the missile and the target; a first antenna element; a first amplifier coupled between the first generator and said first antenna element; a second antenna element; and a second amplifier coupled between said second generator and said second antenna element, said amplifiers receiving signals from their respective generators and amplifying said signals prior to transmitting said signals to their respective antenna elements whence said amplified signals are broadcast to track the target and to render the protective radars ineffective.

5. An in-seeker jamming device as set forth in claim 4, wherein said means for selecting waveforms comprises a logic circuit located in said autopilot, said logic circuit being capable of selectively engaging between said generators in response to the changing distance between the RF missile and the target.

6. An in-seeker jamming device as set forth in claim 5, wherein said jamming device further comprises a receiver coupled between said antenna elements and said autopilot, said receiver receiving incoming target signals from said antennas and transmitting said target signals to said autopilot, said autopilot responding to said target signals so as to select an optimum CAPS waveform.

* * * * *